United States Patent [19]

Masclet

[11] 3,949,645
[45] Apr. 13, 1976

[54] DISTRIBUTING UNIT FOR A DUAL ACTION HYDRAULIC ELECTRO-DISTRIBUTOR

[75] Inventor: Jean Masclet, Paris, France

[73] Assignee: Messier Hispano, Paris, France

[22] Filed: July 2, 1974

[21] Appl. No.: 485,313

[30] Foreign Application Priority Data
July 3, 1973 France .............................. 73.24456

[52] U.S. Cl. ............... 91/459; 91/461; 137/625.64; 137/625.66; 251/30; 251/31
[51] Int. Cl.² .................. F15B 13/043; F16K 31/42
[58] Field of Search ........... 91/459, 461; 137/625.6, 137/625.61, 625.62, 625.63, 625.64, 596.14, 596.15, 596.16, 625.66; 251/30, 31

[56] References Cited
UNITED STATES PATENTS

| | | | |
|---|---|---|---|
| 2,732,860 | 1/1956 | Ray | 137/625.64 |
| 2,931,389 | 4/1960 | Moog et al. | 137/625.62 |
| 2,961,001 | 11/1960 | Pippenger | 137/625.63 |
| 3,015,317 | 1/1962 | Buchanan et al. | 137/625.63 X |
| 3,167,632 | 1/1965 | O'Connor | 137/625.64 X |
| 3,267,965 | 8/1966 | Kroffke | 137/625.66 X |
| 3,454,026 | 7/1969 | Orme | 137/625.64 X |
| 3,473,548 | 10/1969 | Erickson et al. | 137/625.62 X |
| 3,561,489 | 2/1971 | Furrer | 137/625.63 |
| 3,566,919 | 3/1971 | Vanderlaan | 137/625.63 |
| 3,722,547 | 3/1973 | Kirstein | 137/625.63 |
| 3,799,200 | 3/1974 | Tipton | 137/625.6 |

FOREIGN PATENTS OR APPLICATIONS

| | | | |
|---|---|---|---|
| 189,654 | 11/1966 | U.S.S.R. | 137/625.64 |

Primary Examiner—Alan Cohan
Assistant Examiner—Gerald A. Michalsky
Attorney, Agent, or Firm—Haseltine, Lake & Waters

[57] ABSTRACT

A distributing unit for a dual-action hydraulic electro-distributor of the type comprising, firstly, a distribution stage provided with a bore in which a slide is mounted so as to slide between two end positions with a spring return to a central or neutral position and, secondly, a piloting stage with valves controlled selectively by solenoids, each of the valves being adapted, when actuated, to communicate the feed pressure to the corresponding end of the slide and, when not actuated, to set the corresponding end chamber of the bore to return to the tank, wherein untimely displacement of the slide, e.g. in the case of breakage of one of the return-to-neutral springs, is avoided by providing for the slide to comprise a tubular element with two push rods mounted to slide in an axial direction with a seal at its ends, the two push rods being held in abutment with shoulders formed at the ends of the slide by the action of the feed pressure, which is exerted on the surfaces of the push rods facing towards one another, through an orifice formed in the central portion of the slide, the opposed surfaces of the push rods projecting out of the slide and being kept applied to the end walls of the bore when the solenoids are not energized.

8 Claims, 8 Drawing Figures

DISTRIBUTING UNIT FOR A DUAL ACTION HYDRAULIC ELECTRO-DISTRIBUTOR

The invention concerns a distributing unit for dual action hydraulic electro-distributor, for use particularly in controlling devices in which untimely operation may have serious consequences, whereas failure to operate would not have any disadvantage because auxiliary means are provided to operate the system in such a case.

Such conditions are met with, for example, in the control of undercarriages of aircraft, when the lowering and retraction of the undercarriage is controlled by an electric distributor. At least one means for lowering the undercarriage is in fact always provided in case the normal lowering system should break down, and particularly in case of a breakdown involving the electric distributor. On the other hand, if it is possible to have a breakdown of the kind where the undercarriage can be lowered or retracted at a time when the operation is not controlled by the pilot, the consequences may be serious. Untimely lowering of the undercarriage in serious because of the aerodynamic effects, and untimely retraction in dangerous since it causes the aircraft to subside onto the ground.

Distributing units are already known, comprising (a) a distribution stage provided with a bore in which a slide is mounted so as to slide between two end positions, with means for returning the slide to a central or neutral portion by springs, and (b) a piloting stage with valves controlled selectively, e.g. by means of solenoids, to displace the slide within the bore in either direction.

In these units the two end chambers of the slide are under pressure when neither of the solenoids is energised. This arrangement has the following disadvantage.

In cases where the apparatus is abruptly pressurised, if one of the end chambers of the slide contains air and the other is purged, there will be a slower pressure rise at the side which is not purged, that is to say, there will be a momentary difference in pressure at the two ends of the slide and a displacement of the slide. This momentary displacement gives rise to a pressure impulse at the raising or lowering side, which is sufficient to unlock the undercarriage and cause the aircraft to subside if it is on the ground.

In order to avoid this drawback the idea was put forward of using a piloting stage which would keep the ends of the slide in the return position when neither of the solenoids is energised. The slide can be displaced by pressurising the end chamber thereof at the side where the solenoid is energised. In this arrangement, a sudden supply of pressure to the apparatus does not bring any danger of displacing the slide, since its end chambers are in the return position when the slide is at neutral.

However, the danger of untimely displacement of the slide may arise even with this embodiment. If one of the springs for returning the slide to the neutral position should break, the slide will not be held at one side and may in fact be moved away by the vibrations into a position in which it causes the undercarriage to be lowered during flight or retracted while the aircraft is on the ground.

The invention aims to avoid the drawbacks of the distributing units known from the prior art mentioned above, by ensuring that the slide is held in the neutral position in the absence of pressure, in order to avoid momentary feeding of a working orifice when pressure is restored. To this end the distributing unit according to the invention is characterised in that the slide comprises a tubular element with two internal push rods mounted at its ends with a seal, so that they slide in an axial direction, the push rods normally being held apart in abutment with the slide by the action of the feed pressure, which pressure is exerted on the surfaces of the push rods facing towards one another, through an orifice formed in the central portion of the slide, the surfaces of the push rods which are outside the slide being kept applied to the end walls of the bore when the solenoids are not energised.

A distributing unit of this type does not have any of the defects referred to in connection with known distributing units, but it may still give rise to another drawback should mechanical jamming take place at the level of the piloting stage. If, for example, following the energisation and de-energisation of the solenoid controlling raising, the "pressure" valve is prevented from reclosing completely and the "return" valve prevented from reopening completely, there may still be residual pressure in the corresponding end chamber of the bore. This may be such that its action on the end section of the slide is greater than the return force of the central push rod which is subjected to the feed pressure. As will be explained in detail below, it may then happen that, if the current on board the aircraft is cut off after landing, the slide may come into the raising position: the undercarriage will be raised and the aircraft will subside.

The invention also deals with this drawback. To this end the slide has two end bearing surfaces of small diameter. Together with the bore and with fluid-tight bearings integral with the latter, these bearing surfaces define tubular sections of an area $S$. The area $S$ is selected relative to the section $s$ of the push rods so that $s < S < 2s$.

It will be demonstrated below that with this relationship there will never be any untimely operation.

The invention will now be described in detail. In order to explain the arrangement adopted, the conventional arrangements referred to previously will be examined first. The description refers to the accompanying drawings, in which.

Figure 1:
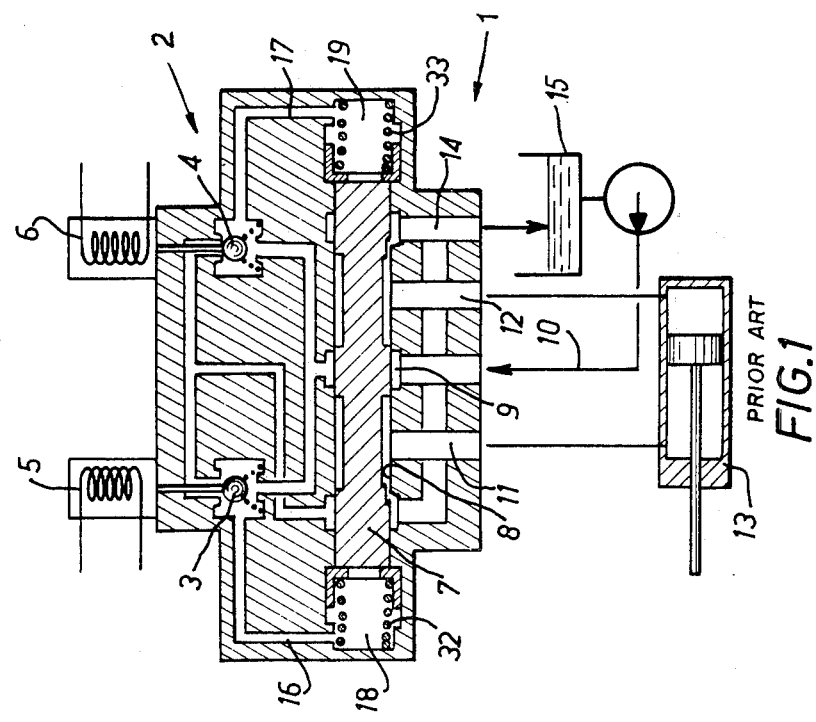
FIG. 1 is a longitudinal section through a distributing unit in a first, well known embodiment of the prior art.

The distributing unit illustrated in FIG. 1 is well known and will therefore be described only very briefly. The unit comprises a distribution stage 1 and a piloting stage 2 with valves or balls 3, 4 controlled by solenoids 5, 6 corresponding respectively to the lowering and raising of the undercarriage. The distribution stage 1 comprises a slide 7 which is mounted so as to slide within a bore 8. Opening into the bore 8 are a supply orifice 9, fed with high pressure fluid through a pipe 10, two working orifices 11, 12 connected respectively to the chambers of a jack 13 for controlling the lowering or raising of a landing chassis, a return orifice 14 connected to the tank 15 and two control passages 16, 17 leading to the ends of the bore 8. As can be seen quite clearly from the figure, the two end chambers 18, 19 of the bore are under pressure when neither of the solenoids is energised. Springs 32, 33 keep the slide 7 in its central or neutral position corresponding to the "jack stopped" arrangement, in which the orifices 11 and 12 connected to the chambers of the jack are isolated from the high pressure and generally put into communication with the return in order to avoid excess pressure through heat expansion.

When one of the control solenoids is energised, the corresponding ball of the piloting stage descends to bear on its lower seat. The end chamber of the slide is then connected to the return orifice 14, and the slide is displaced by the difference in pressure acting on its end sections. One of the chambers of the jack is then put into communication with the high pressure and the other with the return. Symmetrical operation takes place when the other solenoid is energised.

As explained previously, this arrangement is not satisfactory since in cases when the apparatus is abruptly pressurised, if one of the end chambers of the slide contains air and the other is purged, there will be a displacement of the slide resulting in a pressure impulse sufficient to unlock the undercarriage.

Figure 2:
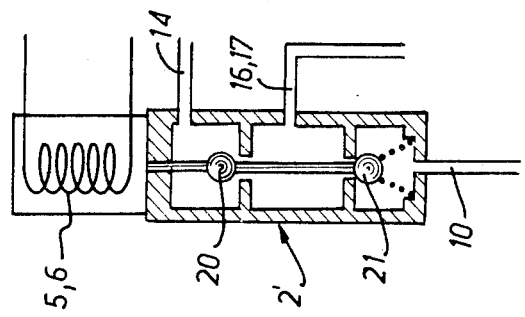
FIG. 2 is a cross-section through a second, known embodiment of the prior art of a distributing unit.

In order to avoid this it is known to use a piloting stage 2' with two balls 20, 21 as shown in FIG. 2. This keeps the ends of the slide at the return 14 if neither of the solenoids 5, 6 is energised. In this arrangement an abrupt supply of pressure to the apparatus will not threaten to displace the slide, since its end chambers are in the return position when the slide is at neutral. But as mentioned previously, if one of the springs 18, 19 for returning the slide to neutral should break, the slide may come into a position where it will cause the undercarriage to be lowered during flight or raised when the aircraft is on the ground.

This is generally prevented by providing for the slide to be held hydraulically in the neutral position by auxiliary pistons. The springs are nevertheless retained to ensure that the slide is held in the neutral position in the absence of any pressure, in order to avoid momentary supplying of a working orifice at the time when pressure is restored.

A simple, compact embodiment of the invention is illustrated in FIGS. 3 to 6. In these figures the piloting stage is not shown for the sake of clarity, since it is absolutely identical with that in FIG. 2. These figures again show the distribution stage provided with the slide 7 which is centered in its neutral position by springs 32, 33 bearing on cup-like members 22, 23. Opening into the bore 8 are the supply orifice 9, the working orifices 11, 12 for lowering and raising, the return orifice 14 and the passages 16, 17 which are connected to the piloting stage at the lowering and retraction side respectively.

In accordance with the invention the slide 7 is tubular and carries two internal push-rods 24, 25 which are mounted so as to slide in threaded casings 26, 27 screwed to the ends of the slide. The central part of the slide contains a radial passage 28 through which the feeding pressure is communicated to the inside of the slide. By the action of the feeding pressure the push rods are thrust outwards to the extended position. Their extension is limited by simultaneous abutment between their outer end and the bottom of the respective end chamber and between an internal flange 29 and the corresponding casing 26, 27. The push rods are also held apart by auxiliary springs 30, 31 which bear against the flanges 29 and shoulders on the inner wall of the slide.

This first embodiment eliminates the drawbacks mentioned in connection with FIGS. 1 and 2.

Figure 4:
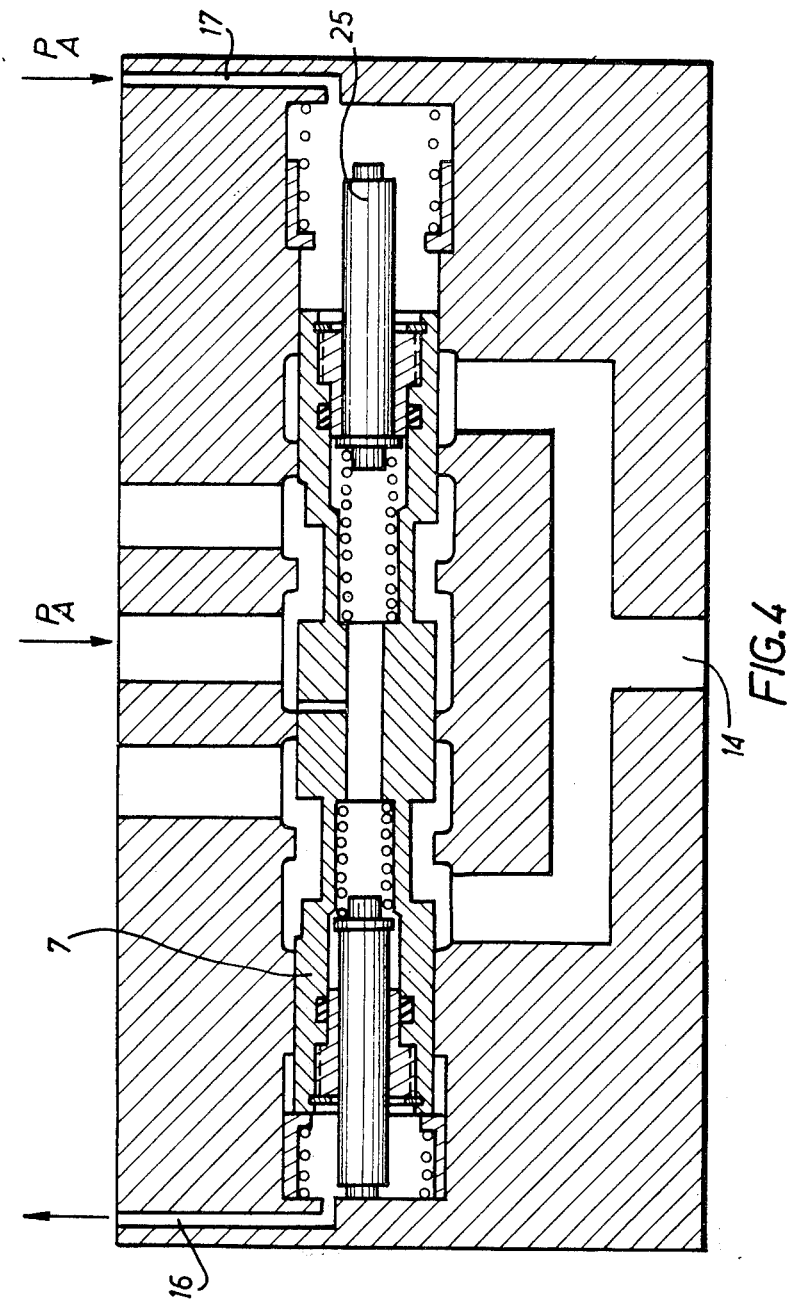
FIG. 4 is a view similar to that in FIG. 3 but positioned as if the solenoid controlling raising were energised.
Figure 5:
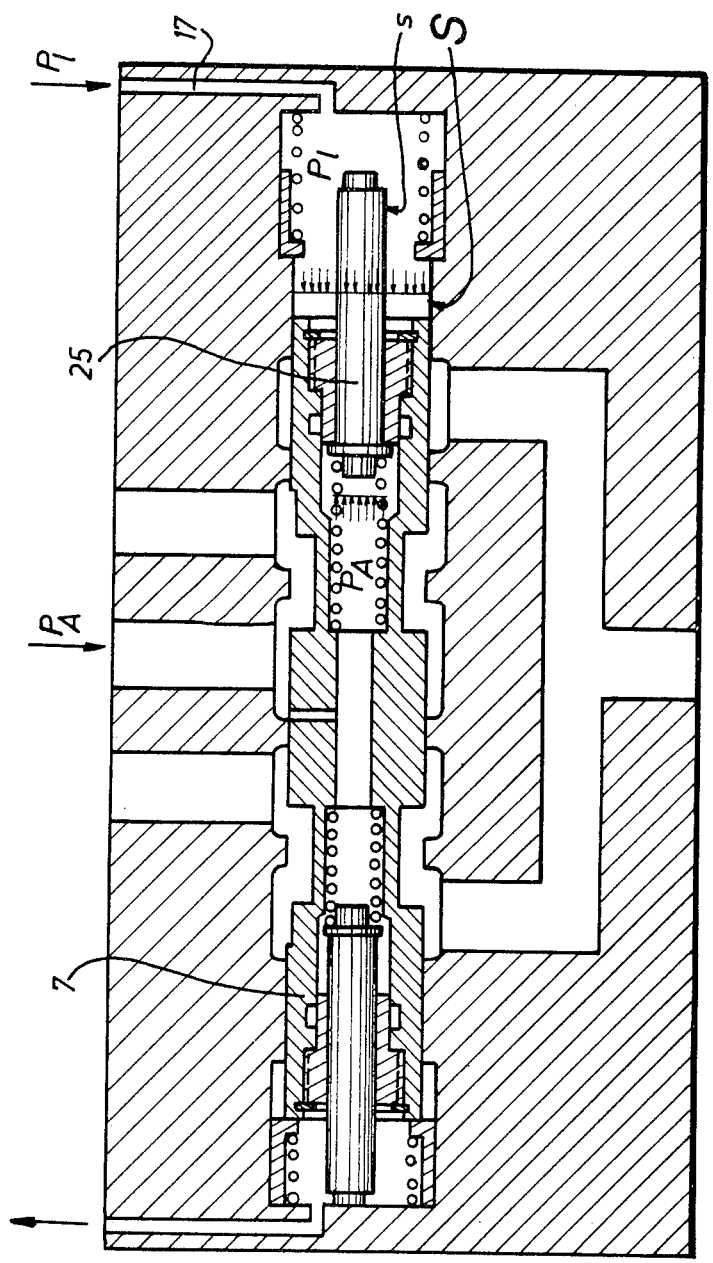
FIG. 5 illustrates the state of the distributing unit in cases where energisation of the raising solenoid is interrupted and residual pressure is left in the corresponding end chamber.

However, it may happen that, when the solenoid controlling raising has been energised, the slide and push rod unit, acted on by the feeding pressure $P_A$ passing through the passage 17, will move into the state illustrated in FIG. 4. Referring now to FIG. 5 it will be assumed that, when the energisation of the solenoid has been cut off, which is usually done shortly after take-off, mechanical jamming takes place at the level of the piloting stage, preventing the "pressure" ball 21 from reclosing completely and the "return" ball 20 from opening completely (see FIG. 2). There is still a residual pressure $P_1$ which may be such that its action on the end section S of the slide 7 is greater than the return force of the central slide 25 of section $s$, which is subjected to the feeding pressure $P_A$. In other words there may be the relationship $$P_1 S > P_A s \tag{1}$$

It should be noted that the discussion which follows does not take account of the forces of the springs, since these are weak relative to those created by pressure in the case of the high pressure feeding used here.

Because of the accidental residual pressure the raising circuit remains pressurised during the whole flight, which does not have any serious disadvantage.

Figure 6:
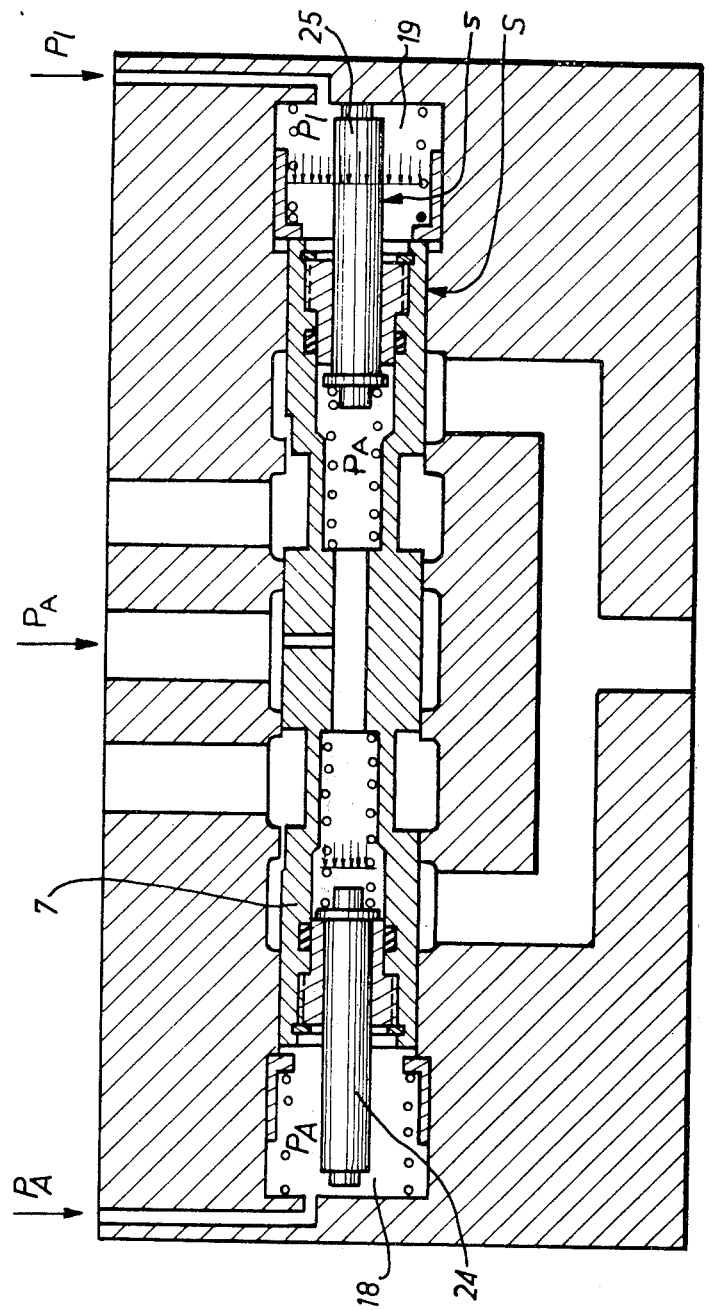
FIG. 6 illustrates a phase of subsequent operation for which the lowering solenoid is energised.

Referring to FIG. 6, the other solenoid is energised before landing. This has the effect of putting the feeding pressure $P_A$ into the chamber 18 opposite the chamber 19 where the residual pressure $P_1$ still prevails, $P_1$ being assumed to be less than $P_A$. The slide 7 will thus return at least to its neutral position since $P_A S > P_1 S$. When the slide reaches the neutral position the return push rod 25 abuts the wall of the bottom of the chamber 19. The resistant force endeavouring to prevent the slide from being displaced beyond the neutral position is then:

$$P_1 (S - s) + P_A s$$

whereas the motive force is $P_A S$.

The slide will therefore come into the lowering position if the relationship $$P_A S > P_1 (S - s) = P_A s \tag{2}$$

is satisfied. In this case the undercarriage will be lowered normally and the aircraft will land.

If the current on board the aircraft is cut off after landing while the hydraulic circuits are still under pressure, as is frequently the case, the lowering solenoid will be de-energised and the corresponding chamber 18 of the slide will be set to return. The apparatus will return to the arrangement which followed take-off, shown in FIG. 5; that is to say, assuming relationship (1) $P_1S > P_As$ to be satisfied, the slide will return to the raising position. The landing chassis will be raised and the aircraft will lower. It is an accident of this type which has to be avoided. Before going into this question, the analysis which follows will first define the conditions under which relationships (1) and (2) are simultaneously confirmed.

Relationship (1) can always be satisfied since S is necessarily larger than $s$ and since nothing prevents $P_1$ from being close to $P_A$. All that is required to satisfy relationship (1) is that $$P_1 > P_A s/S$$

Relationship (2), which allows the slide to pass beyond its neutral position when the control chamber 18 opposite that with the residual pressure is pressurized, may be expressed as $$P_A S - P_A s > P_1 (S - s)$$

or as $$P_A (S - s) > P_1 (S - s).$$

The relationship can similarly always be unless unless
$$P_1 = P_A.$$

Figure 3:
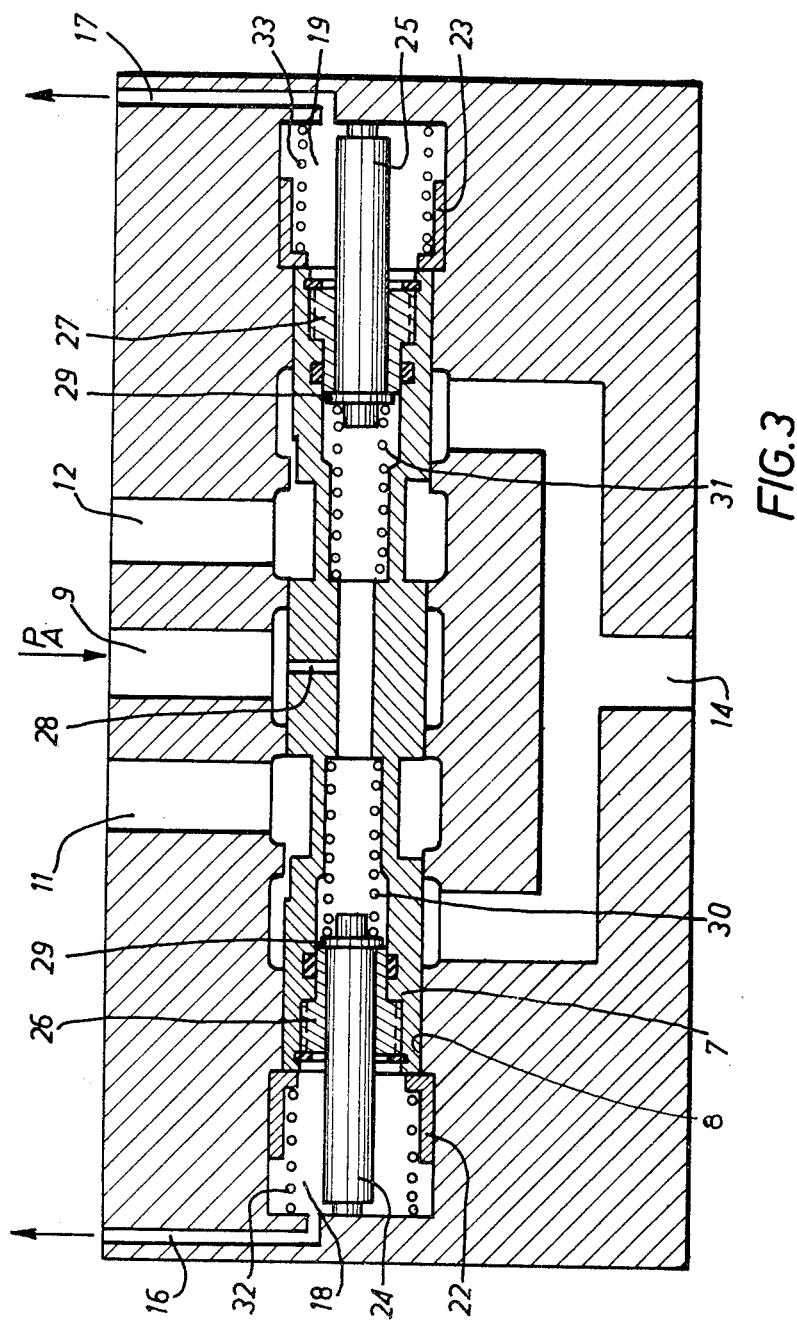
FIG. 3 is a section through a distributing unit according to the invention, positioned as if the solenoids were not energised.

Thus it will be seen that with the apparatus shown in FIG. 3 relationships (1) and (2) will be simultaneously confirmed for:

$$P_A s/S < P_1 < P_A$$

and in this case the breakdown described above may take place.

Figure 7:
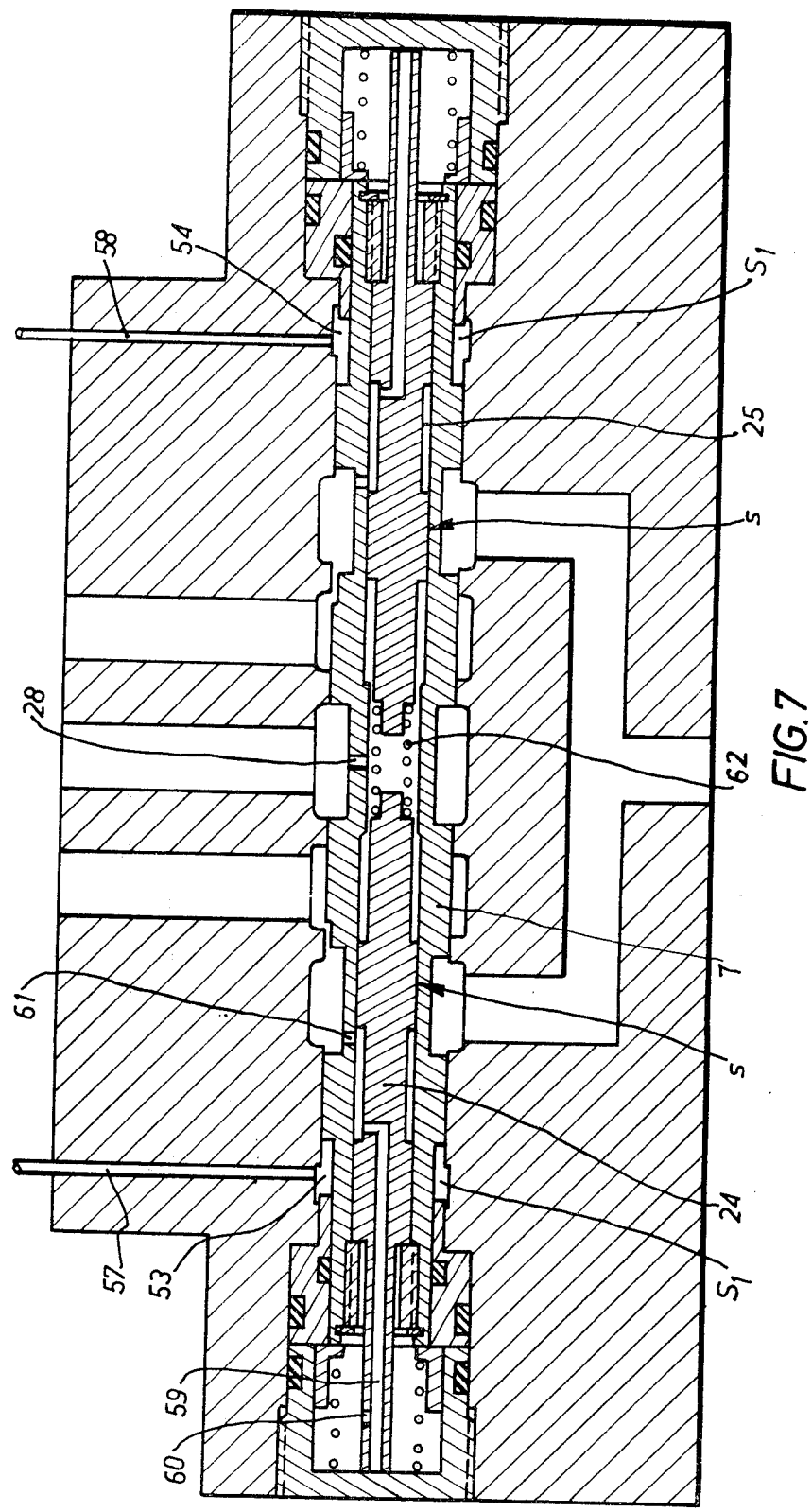
FIG. 7 is a section through a second embodiment of the distributing unit according to the invention.
Figure 8:
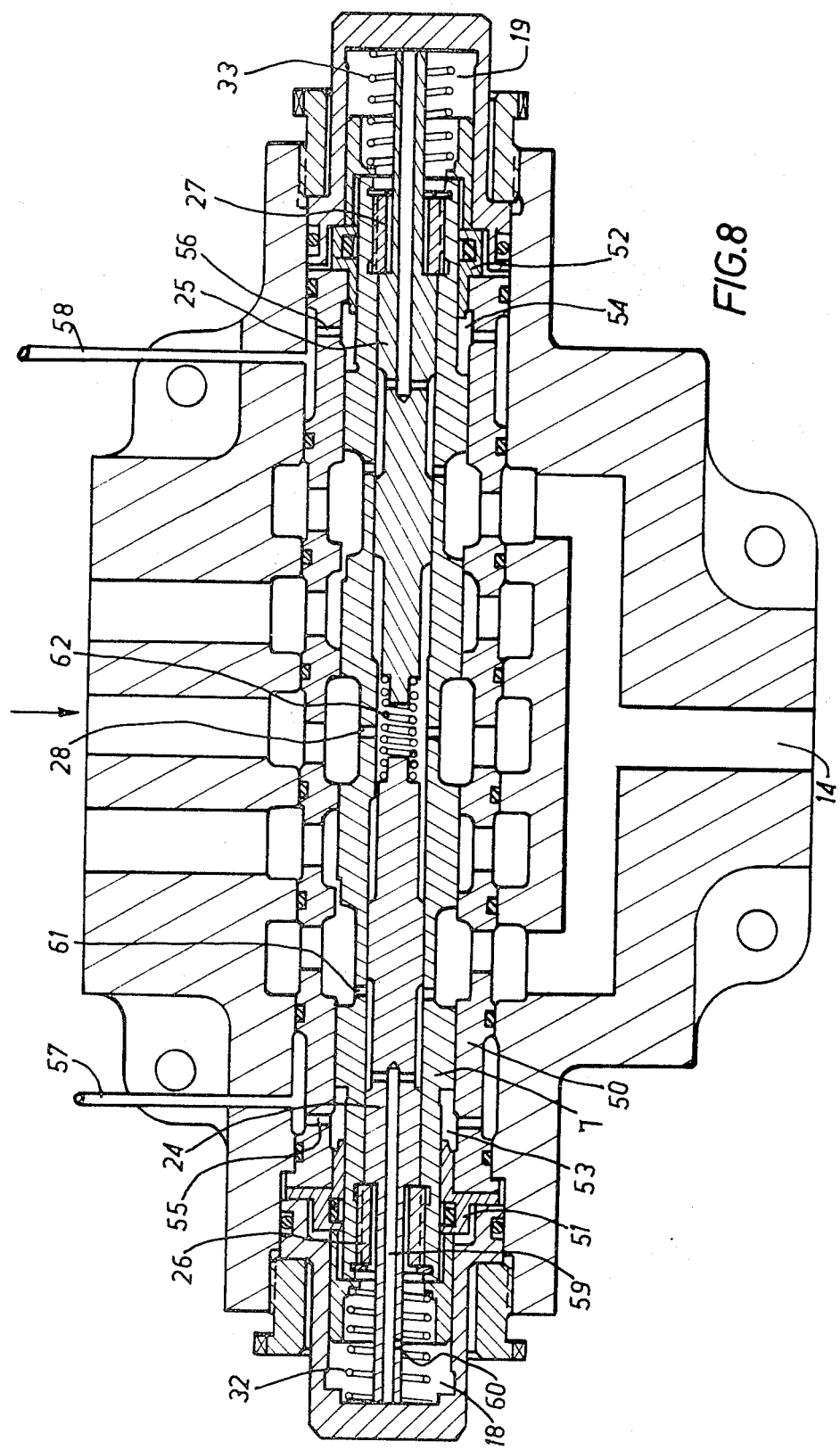
FIG. 8 is a section through a practical embodiment corresponding to FIG. 7.

As will now be demonstrated, such a breakdown is avoided by the second embodiment shown in FIG. 7 and in a practical form in FIG. 8. This last embodiment will now be described, but only in so far as it differs from the FIG. 3 embodiment. On the other hand, components which are similar in FIGS. 7 and 8 will carry the same references.

The slide 7 slides within a jacket 50, the two members forming the distributing unit proper. The ends of the slide have bearing surfaces which are smaller in diameter than the jacket and which pass with a seal through bearings 51, 52. Th bearing surfaces form annular chambers 53, 54, the bottoms of which are formed by the bearings 51, 52. The chambers communicate with the piloting stage through holes 55, 56 formed in the jacket and pipes 57, 58. The end chambers 18, 19 are set to return by means of a co-axial passage 59 and a radial passage 60 formed in each push rod and by means of a hole 61 formed in the wall of the slide and communicating with the return orifice 14.

If this embodiment is adopted, wherein the piloting stage is connected to annular sections $S_1$ of the slide, relationship (1) becomes:

$$P_1 S_1 > P_A s \qquad (1')$$

It can still be confirmed, since $P_aS_1$ must be greater than $P_As$ for the apparatus to operate, and since $P_1$ can be close to $P_A$.

Relationship (2), describing the possibility of the slide's passing beyond its neutral position by the action of the control pressure despite the presence of the residual pressure, is now expressed as follows:

$$P_A S_1 > P_1 S_1 + P_A s \qquad (2')$$

If $P_1 S_1$ in this relationship is replaced by the minimum value which will satisfy relationship (1'), viz $P_1 S_1 \simeq P_A s$, then:

$$P_A S_1 > P_A s + P_A s$$
$$P_A S_1 > 2P_A s$$

or $$S_1 > 2s$$

To prevent this relationship ever from being satisfied all that is required is to make $S_1 < 2s$.

Since $S_1$ must furthermore be greater than $s$ if the apparatus is to operate, it is necessary to have $$s < S_1 < 2s \qquad (3)$$

This choice of the relative sections $S_1$ and $s$ makes it possible to avoid untimely actuation by residual pressure in all cases.

This will be brought out by the analysis which follows, concerning the effect of residual pressure as a function of its level. $S_1$ is taken as being $= s/a$, or $s = aS_1$, with $1/a$ between 1 and 2 ($a$ between 0.5 and 1).

a. If the residual pressure on de-energisation of the solenoid is from $P_A$ to $aP_A$ the slide will remain wide open. The return force $P_A s$ is at the most equal to the force due to the residual pressure, which has a minimum value of $aP_A S_1 = P_A s$. When the solenoid is energized the slide will return to the neutral position but will not be able to go any further since the motive force $P_A S_1$ is less than the resistant force, which is $P_1 S_1 + P_A s$, and has a value of $aP_A S_1 + P_A s = 2P_A s$. The motive force $P_A S_1$ is far less than the resisting force $2P_A s$, since moreover $s < S_1 < 2s$.

b. If the residual pressure which remains is from $aP_A$ to $P_A (1 - a)$ the slide will return to the neutral position on de-energisation but will not be displaced in the opposite direction when the opposed solenoid is energised; the motive force is in fact equal to $P_A S_1$ and the minimum resisting force is equal to $P_1 S_1 + P_A s$ with $P_1 \simeq P_A (1 - a)$, that is to say $(P_A - P_A a) S_1 + P_A s = P_A S_1 - P_A s + P_A s = P_A S_1$, which proves that the motive force is at the most equal to the resisting force.

c. If the residual pressure is less than $P_A (1 - a)$ operation will be normal since the maximum force due to the residual pressure on section $S_1$ is $$P_1 S_1 = P_A (1 - a) S_1 = (P_A - P_A a) S_1 = P_A S_1 - P_A s$$

and since $S_1$ is less than $2s$ this force will be less than $P_A s$ and therefore insufficient, firstly to prevent a return to the neutral position on de-energisation (motive force $P_A s$), secondly to prevent operation when reverse energisation takes place (motive force $P_A S_1 > P_A s$), and finally to allow the slide to pass beyond the neutral position on de-energisation of the opposed slenoid (motive force less than $P_A s$, resisting force equal to $P_A s$). Operation will therefore be normal.

In no case will there be any untimely operation.

In practice the value adopted for $S_1$ will be from 1.3 $s$ to 1.6 $s$, so that there is sufficient force to manipulate the slide under normal conditions and to have enough protection from the danger of untimely displacement in the case of residual pressure.

The presence of the springs for retaining the slide in the neutral position, which has not been dealt with in this study, further increases such protection.

Thus, provided that the areas $S_1$ and $s$ confirm relationship (3), the apparatus shown in FIG. 8 will make it possible to prevent any untimely operation due to the existence of residual pressure.

Furthermore, the apparatus is protected from the danger of having a push rod 24 or 25 seize up in the driven-in position. The jammed push rod no longer fulfils its function of returning the slide and holding it in the neutral position. This function is fulfilled by the spring 32 or 33 which opposes any incorrect movement of the slide due to acceleration or vibration. This is why these springs are arranged outside the slide. The spring 62 in fact fulfils the same function as these other springs but becomes inoperative if a push rod should seize up.

It will be noted that the special arrangement in FIG. 8 enables a breakdown due to jamming to be detected rapidly. In this case it will be impossible for the slide to move in the opposite direction, which would tend to drive in the other push rod, since the play between the facing ends of the push rods is exactly equal to the stroke of the slide. Warning of any breakdown will thus be given by a failure to operate, before the breakdown can become dangerous.

If the jamming effect is not complete and the non-jammed push rod can drive back the other, the danger of incorrect movement will be eliminated for the same reason.

To summarise, the various provisions of the distributing unit described above make it possible to avoid a catastrophic breakdown in which the slide comes into an unintended position. They also enable possible breakdowns to be detected in most cases, through a failure to operate; such failure does not have any dangerous consequences in applications of this type, since auxiliary means are provided to deal with this kind of defect.

I claim:

1. A distributing unit for a dual-action hydraulic electro-distributor of the type comprising, firstly, a distribution stage including a casing provided with a bore and closed at its opposite ends, a slide mounted in said bore so as to slide between two end positions, said bore defining end chambers at the ends of said slide, spring means in said end chambers acting on said slide to return the slide to a central or neutral position and, secondly, a piloting stage with valves controlled selectively by solenoids, each of the said valves being adapted, when actuated, to communicate the feed pressure to a corresponding end of the slide and, when not actuated, to set the corresponding end to return to a tank, wherein untimely displacement of the slide is avoided by the provision wherein the slide comprises a tubular element with two push rods mounted to slide in an axial direction with a seal at its ends, the two push rods being held in abutment with shoulders formed at the ends of the slide by the action of the feed pressure which is exerted on the surfaces of the push rods facing towards one another, through an orifice formed in the central portion of the slide, the opposed surfaces of the push rods projecting out of the slide into said end chambers and being kept applied to the end walls of the bore when the solenoids ae not energized, the control pressure coming from the piloting stage being communicated to two symmetrical annular chambers defined in the bore of the casing, two bearing surfaces of small diameter formed at the ends of the slide, and bearings in which the said ends of the slide are mounted for sliding movement, the said annular chambers having a section S which has a value relative to the section S of the push rods so that $s<S<2s$, said push rods having passage means connecting the end chambers to return to the tank.

2. A distributing unit according to claim 1, wherein said spring means comprises two helical springs which bear on two cuplike centering members, the centering members being in abutment respectively with two shoulders formed in the end chambers in the bore, the length of the slide being substantially equal to the distance between the two shoulders.

3. A distributing unit according to claim 1, wherein the control pressure coming from the piloting stage is communicated to either end of the slide through one of two passages leading into the annular chambers.

4. A distributing unit according to claim 1, wherein the slide is sealed at the ends by said push rods which are mounted so as to slide in threaded casings, the casings being screwed with a seal on the ends of the slide.

5. A distributing unit according to claim 4, wherein the slide contains a radial hole half way along its length, through which hole the feed pressure is admitted into the slide.

6. A distributing unit according to claim 4, wherein each of the push rods is urged towards the corresponding end of the slide by a helical spring disposed between the push rods, the length of the push rods being such that, when the slide is in the neutral position, the outer end of each push rod is simultaneously in abutment with the wall at the end of the bore, while an annular flange on each push rod is in abutment with the inner end of the corresponding threaded casing 7. A distributing unit according to claim 1, wherein the area $S$ is between $1.3\ s$ and $1.6\ s$.

8. A distributing unit according to claim 1, wherein the slide is mounted inside a stationary jacket in which radial passages are provided at appropriate positions, to allow for communication between the slide on the one hand and a source of supply, passages for return to the tank, passages connected to the chambers of a control jack and control passages connected to the piloting stage on the other hand.

* * * * *